United States Patent
Grob et al.

(10) Patent No.: US 6,801,862 B2
(45) Date of Patent: Oct. 5, 2004

(54) METHOD AND SYSTEM FOR CONTROLLING THE BRAKING FORCE IN A VEHICLE

(75) Inventors: Ferdinand Grob, Besigheim (DE); Dietmar Arndt, Kleinsachsenheim (DE); Rolf Maier-Landgrebe, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/332,687

(22) PCT Filed: Apr. 17, 2002

(86) PCT No.: PCT/DE02/01422

§ 371 (c)(1),
(2), (4) Date: Aug. 25, 2003

(87) PCT Pub. No.: WO02/090160

PCT Pub. Date: Nov. 14, 2002

(65) Prior Publication Data

US 2004/0019422 A1 Jan. 29, 2004

(30) Foreign Application Priority Data

May 10, 2001 (DE) .......................... 101 22 614

(51) Int. Cl.⁷ ............................. B60T 8/00; B60T 8/52; G06F 15/00
(52) U.S. Cl. ............................. 702/41; 701/70; 701/78; 701/84; 303/112
(58) Field of Search .................... 702/41, 70, 76, 702/78, 82–84; 73/801, 862.381, 862.391, 862.41; 303/190, 191, 186

(56) References Cited

U.S. PATENT DOCUMENTS

| | | | |
|---|---|---|---|
| 4,822,113 A | | 4/1989 | Amberg et al. .............. 303/191 |
| 5,279,394 A | | 1/1994 | Zimmermann et al. . 188/1.11 E |
| 5,605,387 A | | 2/1997 | Cook et al. ................. 303/132 |
| 6,206,488 B1 | * | 3/2001 | Binder et al. .......... 303/122.04 |
| 6,339,739 B1 | * | 1/2002 | Folke et al. ................... 701/70 |
| 6,564,135 B2 | * | 5/2003 | Grob et al. .................... 701/70 |
| 6,619,135 B2 | * | 9/2003 | Liebemann et al. .......... 73/801 |
| 6,641,234 B2 | * | 11/2003 | Kost et al. ................... 303/190 |

FOREIGN PATENT DOCUMENTS

EP    1 095 834    5/2001

* cited by examiner

Primary Examiner—Kamini Shah
(74) Attorney, Agent, or Firm—Kenyon & Kenyon

(57) ABSTRACT

A method of controlling the braking force in a vehicle has the following steps: determining actual values of controlled variables; determining setpoint values of controlled variables; comparing the actual values with the setpoint values, thereby obtaining comparison results; and influencing wheel forces on the basis of the comparison results, wheel forces being used as controlled variables, the actual values of the wheel forces being determined by a sensor system which measures the wheel force, torques having a modulation frequency being generated at the wheels, whereby the slip of the wheels and the wheel force of the wheels are modifiable, the slip of the wheels and the wheel forces of the wheels are analyzed, and the setpoint values of the wheel forces are determined from the analysis of the slip of the wheels and the wheel forces of the wheels. A system for controlling the braking force in a vehicle is also described.

24 Claims, 3 Drawing Sheets

METHOD AND SYSTEM FOR CONTROLLING THE BRAKING FORCE IN A VEHICLE

PRIORITY DOCUMENT

This is a national stage entry of PCT International Application No. PCT/DE02/01422, on the day of the Apr. 17, 2002, which claims Foreign Priority of German document 101-22-614.4, May 10, 2001.

FIELD OF THE INVENTION

The present invention relates to a method of controlling the braking force in a vehicle having the following steps: determining actual values of controlled variables; determining setpoint values of controlled variables; comparing the actual values with the setpoint values, thereby obtaining comparison results; and influencing wheel forces on the basis of the comparison results. The present invention further relates to a system for controlling the braking force in a vehicle having means for determining actual values of controlled variables, means for determining setpoint values of controlled variables, means for comparing the actual values with the setpoint values, thereby obtaining comparison results, and means for influencing wheel forces on the basis of the comparison results.

BACKGROUND INFORMATION

Generic control methods and control systems of this type are implemented, for example, within ABS (antilock braking system), TCS (traction control system), and ESP (electronic stability program). Wheel force slip curves, also referred to as $\mu$ slip curves, may be advantageously used as a basis of such systems. Examples of such curves are shown in FIG. 3, where curve a is a longitudinal force-longitudinal slip characteristic, hereinafter referred to as longitudinal force characteristic, and curve b is a transverse force-longitudinal slip characteristic, hereinafter referred to as transverse force characteristic. The figure shows that, for low longitudinal forces, i.e., for low braking torques, for example, the longitudinal slip increases linearly with the wheel force which is transmitted by a wheel to the road surface. In this range the force increases monotonously with the slip until it reaches a maximum; a largely linear relationship exists in the lower longitudinal slip range. With increasing pressure in the brake cylinder, the braking force therefore also increases. This range is referred to as the stable range of the $\mu$ slip curve. As the force further increases in the brake system, the force transmitted to the road drops after exceeding the maximum. In this range steady-state slip no longer occurs, but rather the wheel ultimately tends to lock. This range of the $\mu$ slip curve is known as the unstable range.

Today's control systems operate over a broad range of the $\mu$ slip curve during the control cycles. The wheel forces that occur are only determined indirectly via the change in the wheel rpm over time, the control utilizing other input variables such as steering angle, brake pilot pressure, rotational speed, longitudinal and transverse vehicle acceleration, as well as engine rpm and engine torque.

Today's controls, for example, ABS, operate as follows. When braking, the wheel brake pressure first increases rapidly. As soon as the wheel deceleration exceeds a fixed threshold, the wheel brake pressure decreases until it remains greater than the fixed threshold. After the brake pressure drops below the threshold, the pressure increases slowly for a certain time period. A rapid pressure increase follows if a new control cycle is not initiated beforehand by overbraking. In today's systems, control is modified by taking into account additional controlled variables such as, for example, the peripheral wheel acceleration. Finally, in today's control systems a constant pressure increase or pressure decrease takes place in the braking system, which requires a high flow rate of brake fluid. This results in the known pulsating brake pedal as the ABS control kicks in.

In conventional traction control systems, another disadvantage is that the relationships between the wheel forces and the wheel slip, i.e., the $\mu$ slip curves, are insufficiently known because the shape of the curves is highly dependent on external conditions such as friction coefficient, normal force, and slip angle and therefore they are not determinable with the desired accuracy via the conventionally used controlled variables. Therefore it is only possible to set the wheel forces approximately.

SUMMARY OF THE INVENTION

The present invention is based on the generic method due to the fact that wheel forces are used as controlled variables, the actual forces of the wheel forces are determined by a sensor system which measures the wheel forces, torques having a modulation frequency are generated at the wheels whereby the slip of the wheels and the wheel forces at the wheels are modifiable, the slip of the wheels and the wheel forces of the wheels are analyzed, and the setpoint values of the wheel forces are determined from the analysis of the slip of the wheels and the wheel forces of the wheels. Thus, the wheel forces are measured during a control cycle and assigned to the instantaneous wheel slip. It is then possible to update the values thus determined on an ongoing basis by modulating the wheel torques. Finally, it is possible to determine the setpoint value and the actual value of the wheel forces and to set the wheel force at the setpoint value.

The longitudinal forces are preferably determined by the sensor system which measures the wheel forces. These longitudinal forces are particularly important during braking and acceleration, the setpoint values of the wheel forces being determined so that maximum wheel forces are obtained.

It may also be very advantageous that the transverse forces are determined by the sensor system which measures the wheel forces. The transverse forces are to be taken into account as important variables, in particular with respect to the stabilization of a vehicle tending to spin.

In a particularly advantageous embodiment of the method according to the present invention, this concept is refined by generating the torques at the wheels hydraulically. A hydraulic modulation frequency may be introduced separately for each individual wheel or also jointly for the wheels of one axle or for all wheels. Existing hydraulic components of the brake system are preferably used in the hydraulic torque variation.

However, it may also be advantageous that the torques at the wheels are generated by electric motors. The actual braking force provided by a hydraulic system is also in this case controlled individually for each wheel. The hydraulic system provides a braking pressure which is constant on average within a time interval or approximately 50 ms. In this time, the braking torque is varied continuously using a preferably fixed modulation frequency using an electric motor. This modulation of the braking torque may take place for each wheel, for each axle, or for all wheels identically. The modulation is not used for the actual active braking, but rather for injecting a specific interference signal into the braking operation. Since this interference signal may be the same for all or multiple wheels, it may be injected into the power train centrally, for example.

Furthermore, the present invention may be refined particularly advantageously by the fact that the amplitude of the modulation frequency is considerably less than the torques that occur in normal driving operation. Therefore, the normal driving operation is not influenced by the superposition of varying torques; nevertheless, the influence of the torques on the wheel force and slip may be determined.

It is furthermore particularly advantageous that the wheel forces and the slip of the wheels are analyzed in the specific frequency range of the known modulation frequency. In this way, very low-noise signals are obtained, which allow accurate analysis of the relevant values.

In the preferred embodiments of the method according to the present invention, the modulation frequency is in the range from 50 Hz to 100 Hz. Frequencies in this range may be represented, for example, using an electric motor, and they are sufficiently high to provide a sufficiently rapid control.

Furthermore, it is possible to refine the method according to the present invention advantageously in that longitudinal wheel force characteristics of the wheels are determined by analyzing the wheel forces and the slip of the wheels and the wheel forces at the maximum of the longitudinal wheel force characteristics are used as wheel force setpoint values. Due to the superposition of the modulation torques, a broad range of the possible wheel forces is thus analyzable, so that current wheel force characteristics ($\mu$ slip characteristics) are always available. At the maximum of the longitudinal wheel force characteristic the maximum force is transferable by the wheels to the road surface; therefore it makes sense to use this point of the longitudinal wheel force characteristic as the setpoint value of the control.

The method according to the present invention is furthermore advantageous due to the fact that transverse wheel force characteristics of the wheels are determined by analyzing the wheel forces and the slip of the wheels, and a setpoint slip of the particular wheels at which the setpoint values of the particular transverse wheel forces occur is determined from the transverse wheel force characteristics. Thus, the method according to the present invention may be utilized for stabilizing a vehicle tending to spin. The setpoint slip at which the required transverse forces occur is determinable for each wheel using the transverse force characteristic.

In a preferred refinement of the method according to the present invention, it is configured so that a slip $\lambda_0$ corresponding to zero longitudinal wheel force is determined by extrapolating the linearly increasing range of a longitudinal wheel force characteristic, and the determined values of the wheel slip are corrected using slip $\lambda_0$. This refinement of the method may be configured, for example, so that initially the approximately linearly increasing stable portion of the longitudinal wheel force characteristic is identified and subsequently the zero crossing is determined, for example, by linear extrapolation. This zero crossing corresponds to slip $\lambda_0$ at which the longitudinal force is equal to zero. Thus the speed of the freely rolling wheel, i.e., the translational wheel speed, is determinable. If the wheel slip has no error, the following equation must apply: $\lambda_0=0$. However, if there is a deviation, the wheel slip determined by forming a reference is correctable by the value $\lambda_0$.

The method according to the present invention is configured in a particularly simple and advantageous manner so that the increase of a longitudinal wheel force characteristic is determined from the wheel slip modulation divided by the longitudinal wheel force modulation. Thus the values relevant to the longitudinal wheel force characteristic are available via simple mathematical operations.

The present invention is based on the generic system due to the fact that the controlled variables are wheel forces, the means for determining the actual values of the wheel forces are implemented as a sensor system which measures the wheel forces, means for modulating torques at the wheels are provided with a modulation frequency whereby the slip of the wheels and the wheel forces at the wheels are modifiable, means are provided for analyzing the slip of the wheels and the wheel forces of the wheels, and the means for determining the setpoint values use the results of the analysis of the slip of the wheels and the wheel forces of the wheels. In this way, the advantages of the method according to the present invention are implemented in a wheel slip control system. In particular, the wheel forces are directly used as controlled variables. Furthermore, the setpoint values of the wheel forces are rapidly adjusted and the adjusted values are taken into account in the control of the wheel forces.

The longitudinal forces are preferably determinable by the sensor system which measures the wheel forces. These longitudinal forces are particularly important during braking and acceleration, the setpoint values of the wheel forces being determined so that maximum wheel forces are obtained.

It may also be very advantageous that the transverse forces are determinable by the sensor system which measures the wheel forces. The transverse forces are to be taken into account as important variables, in particular with respect to the stabilization of a vehicle tending to spin.

In a particularly advantageous embodiment of the system according to the present invention, this concept is refined by the fact that the torques at the wheels are hydraulic means. A hydraulic modulation frequency may be introduced separately for each individual wheel or also jointly for the wheels of one axle or for all wheels. Existing hydraulic components of the brake system are preferably used in the hydraulic torque variation.

However, it may also be advantageous that the torques at the wheels are electric motors. The actual braking force provided by a hydraulic system is also in this case controlled individually for each wheel. The hydraulic system provides a braking pressure which is constant on average in a time interval of approximately 50 ms. In this time, the braking torque is varied continuously using a preferably fixed modulation frequency using an electric motor. This modulation of the braking torque may take place for each wheel, for each axle, or for all wheels identically. The modulation is not used for the actual active braking, but rather for injecting a specific interference signal into the braking operation. Since this interference signal may be the same for all or multiple wheels, it may be injected into the power train centrally, for example.

Furthermore, the present invention may be refined particularly advantageously by the fact that the amplitude of the modulation frequency is considerably less than the torques that occur in normal driving operation. Therefore, normal driving operation is not influenced by the superposition of the varying torques; nevertheless, the influence of the torques on the wheel force and slip may be determined.

It is furthermore of particular advantage that the means for analyzing the wheel forces and the slip of the wheels operate in the specific frequency ranges of the known modulation frequency. In this way, very low-noise signals are obtained, which allow accurate analysis of the relevant values.

In the preferred embodiments of the system according to the present invention, the modulation frequency is in the range from 50 Hz to 100 Hz. Frequencies in this range may be represented using, for example, an electric motor and they are sufficiently high to provide a sufficiently rapid control.

Furthermore, it is possible to refine the system according to the present invention advantageously in that longitudinal wheel force characteristics of the wheels are determinable by analyzing the wheel forces and the slip of the wheels and the wheel forces at the maximum of the longitudinal wheel force characteristics are used as wheel force setpoint values. Due to the superposition of the modulation torques, a broad range of the possible wheel forces is thus analyzable, so that current wheel force characteristics ($\mu$ slip characteristics) are always available. At the maximum of the longitudinal wheel force characteristic the maximum force is transferrable by the wheels to the road surface; therefore it makes sense to use this point of the longitudinal wheel force characteristic as the setpoint of the control.

The system according to the present invention is furthermore advantageous due to the fact that transverse wheel force characteristics of the wheels are determinable by analyzing the wheel forces and the slip of the wheels, and a setpoint slip of the particular wheels at which the setpoint values of the particular transverse wheel forces occur is determined from the transverse wheel force characteristics. Thus, the method according to the present invention may be utilized for stabilizing a vehicle tending to spin. The setpoint slip at which the required transverse forces occur is determinable for each wheel using the transverse wheel force characteristic.

In a preferred refinement of the system according to the present invention, it is configured so that a slip $\lambda_0$ corresponding to zero longitudinal wheel force is determinable by extrapolating the linearly increasing range of a longitudinal wheel force characteristic, and the determined values of the wheel slip are correctable using slip $\lambda_0$. This refinement of the method may be configured, for example, so that initially the approximately linearly increasing stable portion of the longitudinal wheel force characteristic is identified and subsequently the zero crossing is determined, for example, by linear extrapolation. This zero crossing corresponds to slip $\lambda_0$ at which the longitudinal force is equal to zero. Thus the speed of the freely rolling wheel, i.e., the translational wheel speed, is determinable. If the wheel slip has no error, the following equation must apply: $\lambda_0=0$. However, if there is a deviation, the wheel slip determined by forming a reference is correctable by the value $\lambda_0$.

The system according to the present invention is configured in a particularly simple and advantageous manner so that the increase of a longitudinal wheel force characteristic is determinable from the wheel slip modulation divided by the longitudinal wheel force modulation. Thus the values relevant to the longitudinal wheel force characteristic are available via simple mathematical operations.

The present invention is based on the recognition that it is possible to identify the $\mu$ slip curves using the measured wheel forces. Knowing the $\mu$ slip makes it possible to determine the setpoint values for the wheel slip controller with a considerably higher accuracy than by using conventional systems and thus to significantly improve the function of the wheel slip control systems.

DETAILED DESCRIPTION

Figure 1:
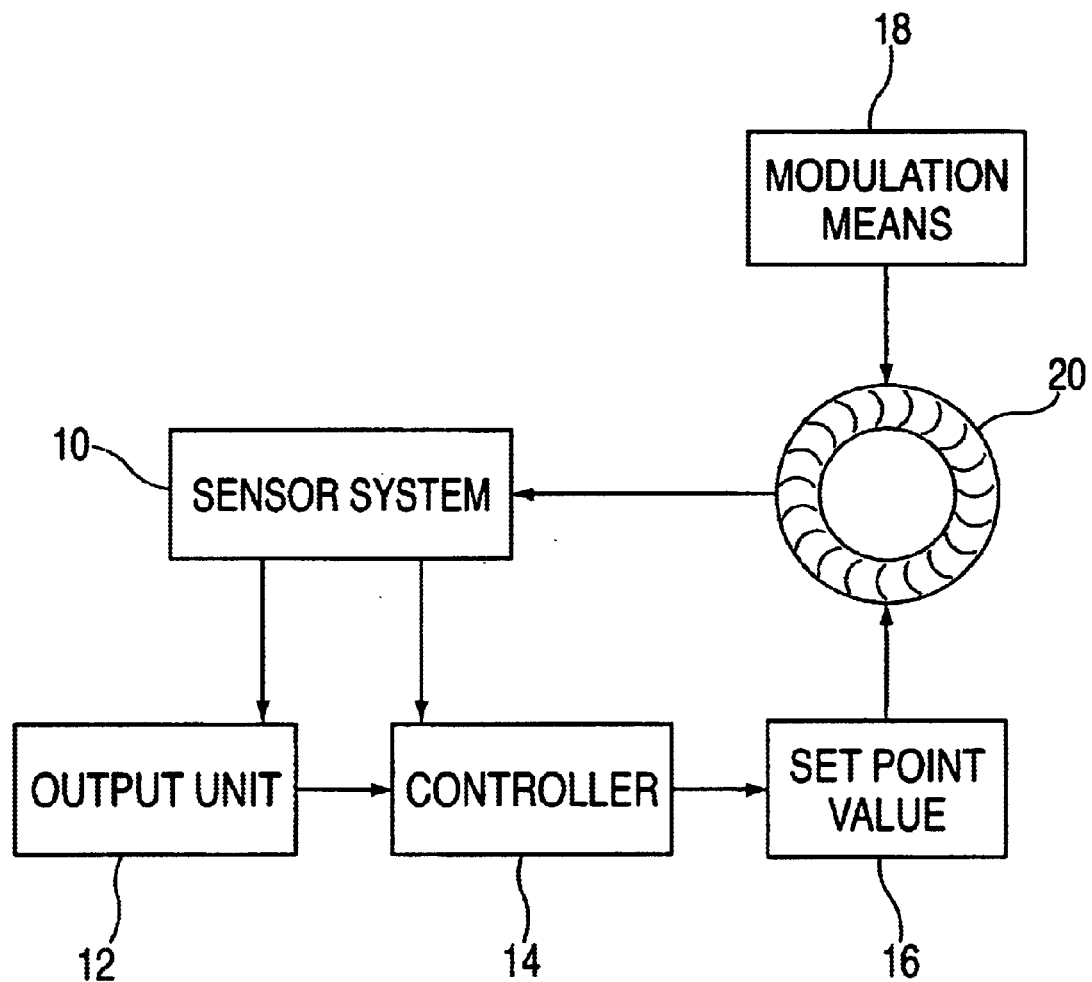
FIG. 1 shows a block diagram of a system according to the present invention.

FIG. 1 shows a block diagram of a system according to the present invention. A wheel 20 is shown representing the wheels of a motor vehicle. A sensor system 10 measuring the wheel force is provided for measuring the wheel forces of wheel 20. The output data of sensor system 10 which measures the wheel force is output to a unit 12 in which the wheel forces and the slip of the wheels are analyzed. For this purpose, additional information, for example, regarding the braking pressure may also be available to unit 12. In unit 12, a characteristic curve, from which an instantaneous setpoint value of the wheel force is determined by determining the maximum value of the characteristic curve, is generated by analyzing various wheel forces. The determined setpoint value is relayed to controller 14. Controller 14 further receives information regarding the actual values of the wheel force, this information being directly transmitted by sensor system 10 measuring the wheel force in this example. The setpoint values are compared with the actual values of the wheel forces in controller 14. If the actual values do not coincide with the setpoint values, means 16, which directly influence the wheel force on wheel 16, are activated. For example, the braking pressure is directly modified.

In order to measure the $\mu$ slip curve as accurately as possible, modulation means 18 are provided, which impress low-amplitude excitation signals on wheel 20 (lock-in method). The wheel slip is periodically modified using hydraulic intervention or via electric wheel motors. Unit 12 than performs the analysis in the specific frequency range of the known excitation frequency, for example, at 50 Hz. Low-noise signals are thus obtained which allow accurate identification of the $\mu$ slip characteristic.

Figure 2:
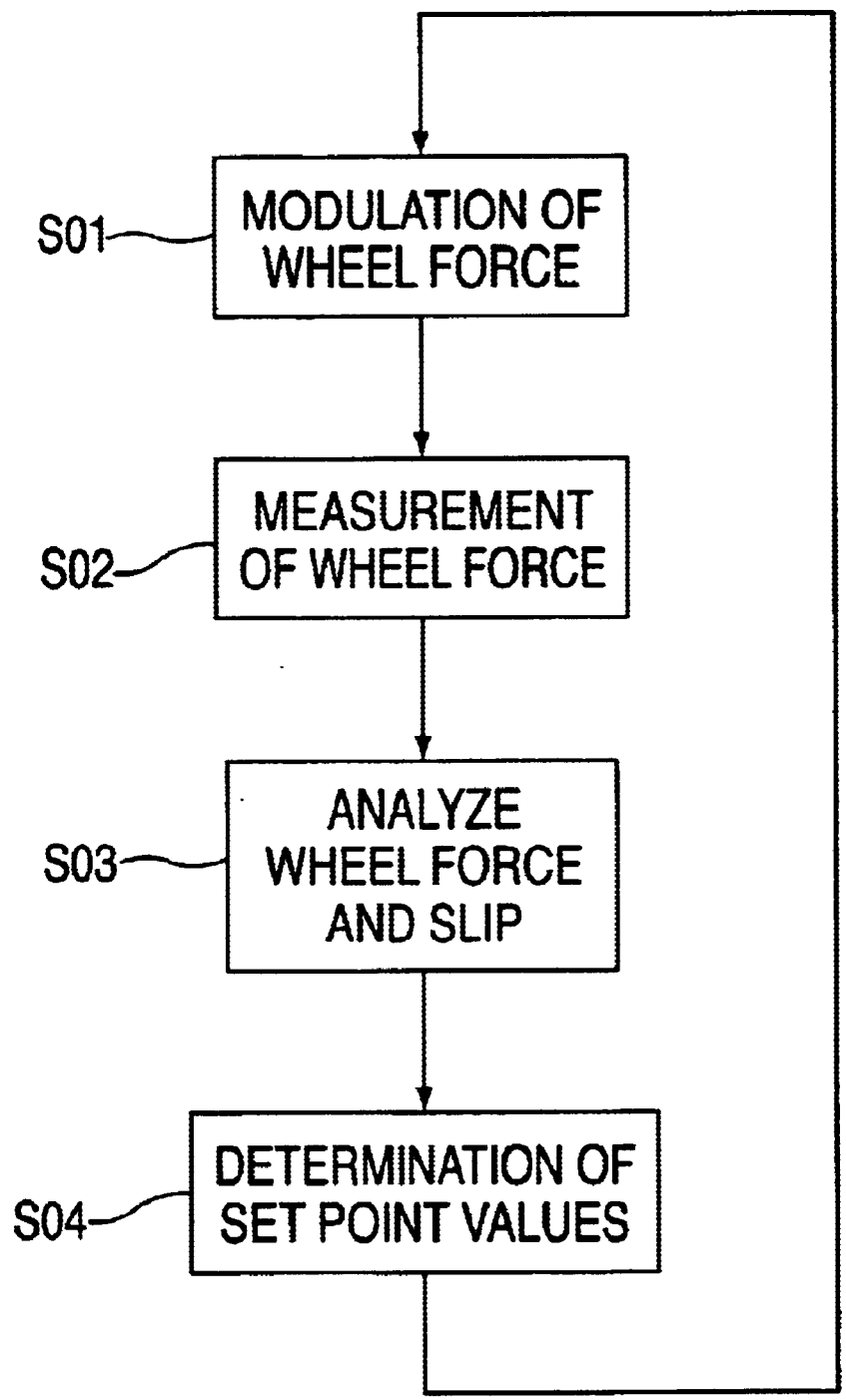
FIG. 2 shows a flow chart of a method of determining setpoint values of wheel forces.

FIG. 2 shows a flow chart representing a portion of a control cycle, a setpoint value being determined in this portion. The following steps are identified by the symbols of FIG. 2:

S01: modulation of wheel force

S02: measurement of wheel force

S03: analysis of wheel force and slip

S04: determination of setpoint values

The wheel force is modulated in step S01. This modulation of the wheel force is performed continuously. Frequencies in the range of 50 Hz to 100 Hz may be used as modulation frequencies.

In step S02 the wheel force is measured. Measurement of the wheel force using a sensor system (10, FIG. 1) measuring the wheel force is used for measuring actual values needed by the controller (14, FIG. 1).

The results of the actual value measurement by the sensor system (10, FIG. 1) measuring the wheel force is also transmitted to a unit (12, FIG. 1) in which the wheel force and the slip are analyzed. This takes place in step S03 in FIG. 2. The braking pressure may be additionally used, for example, for analyzing the slip.

Subsequently in step S04 the setpoint values of the wheel force are determined, the wheel force corresponding to the maximum of the $\mu$ slip curve being preferably used as the setpoint value.

Figure 3:
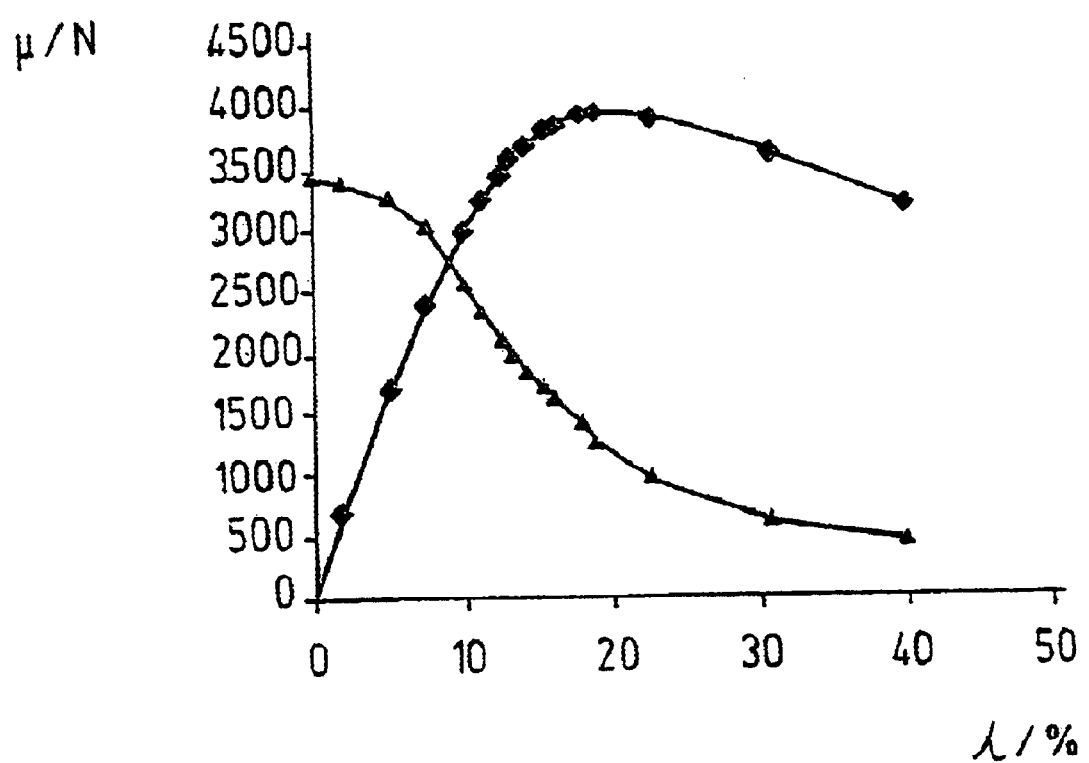
FIG. 3 shows a diagram with $\mu$ slip curves.

FIG. 3 shows two $\mu$ slip curves. Wheel force 1 is plotted on the vertical axis against the longitudinal wheel slip on the horizontal axis. Curve a provides the $\mu$ slip curve for the longitudinal wheel force. Curve b provides the $\mu$ slip curve for the transverse wheel force.

As was described in connection with the related art, the longitudinal force curve begins with an approximately linear range, which, after a maximum, is followed by a decreasing range. The increasing range is known as the stable range; the decreasing range is unstable and ultimately results in the wheels becoming locked. The maximum of the longitudinal wheel force characteristic identifies the maximum wheel force which may be transferred onto the road surface. Thus the maximum of the longitudinal wheel force characteristic is suitable as the setpoint value for a controller.

The transverse wheel force characteristic is useful in particular for stabilizing a vehicle tending to spin.

The determination of the setpoint slip is illustrated using two examples:

EXAMPLE 1

In straight-ahead ABS braking, the objective is the shortest possible braking path. Therefore, the slip at which the longitudinal wheel force characteristic assumes its maximum value is determined as setpoint slip $\lambda^*$ for the ABS slip controller. In the figure, this value is equal to $\lambda^*=20\%$.

EXAMPLE 2

In order to stabilize a vehicle tending to spin, a certain transverse force is required on each wheel. Setpoint slip $\lambda^*$ at which the required transverse forces occur is determinable for each wheel using the transverse wheel force characteristic.

The influence of the torque modulation is explained below using three examples.

EXAMPLE 1

Periodic wheel slip excursion PD and longitudinal wheel force excursion FL are in phase. This means that the braking force increases with increasing braking pressure. Consequently, the wheel is in the stable portion of the longitudinal wheel force characteristic.

EXAMPLE 2

Longitudinal wheel force excursion FL does not change despite the variation of the wheel slip excursion PD. This means that the wheel is at the local maximum of the longitudinal wheel force characteristic.

EXAMPLE 3

Wheel slip excursion PD and longitudinal wheel force excursion FL are in phase opposition. This means that the braking force decreases with increasing braking pressure. The wheel is in the unstable portion of the longitudinal wheel force characteristic.

The longitudinal wheel force characteristic may furthermore be advantageously used for determining the translational wheel speed. If the approximately linearly increasing portion of the longitudinal wheel force characteristic is identified, it is possible to determine the zero crossing, i.e., slip $\lambda_0$ at which the longitudinal force is zero, for example, by linear extrapolation. In this way, the speed of the freely rolling wheel is determinable, which is known as the translational wheel speed. If the wheel slip has no error, the following equation must apply: $\lambda_0=0$. However, if there is a deviation, the wheel slip determined by forming a reference is correctable by the value $\lambda_0$.

The preceding description of the exemplary embodiments of the present invention serves only the purpose of illustration and not to limit the present invention. Various modifications are possible within the framework of the present invention without going beyond the scope of the present invention or its equivalents.

What is claimed is:

1. A method of controlling a braking force in a vehicle, comprising:

determining actual values of controlled variables;

determining setpoint values of the controlled variables;

comparing the actual values with the setpoint values, thereby obtaining comparison results; and influencing wheel forces on the basis of the comparison results, wherein:

the wheel forces are used as the controlled variables, the actual values of the wheel forces are determined by a sensor system that measures the wheel forces, torques having a modulation frequency are generated at wheels, thereby enabling a slip of the wheels and the wheel forces at the wheels to be modifiable, the slip of the wheels and the wheel forces of the wheels are analyzed, and the setpoint values of the wheel forces are determined from an analysis of the slip of the wheels and from the wheel forces of the wheels.

2. The method as recited in claim 1, further comprising:

determining longitudinal forces by the sensor system.

3. The method as recited in claim 1, further comprising:

determining transverse forces by the sensor system.

4. The method as recited in claim 1, wherein:

the torques at the wheels are hydraulically generated.

5. The method as recited in claim 1, wherein:

the torques at the wheels are generated by an electric motor.

6. The method as recited in claim 1, wherein:

an amplitude of a modulation frequency is considerably less than the torques occurring in a normal driving operation.

7. The method as recited in claim 1, further comprising:

analyzing the wheel forces and the slip of the wheels in specific frequency ranges of a known modulation frequency.

8. The method as recited in claim 6, wherein:

the modulation frequency is in the range from 50 Hz to 100 Hz.

9. The method as recited in claim 1, further comprising:

determining longitudinal wheel force characteristics of the wheels by analyzing the wheel forces and the slip of the wheels, wherein:

the wheel forces at a maximum of the longitudinal wheel force characteristics are used is wheel force setpoint values.

10. The method as recited in claim 1, further comprising:

determining transverse wheel force characteristics of the wheels by analyzing the wheel forces and the slip of the wheels; and determining a setpoint slip of particular ones of the wheels at which the setpoint values of transverse wheel forces occur from the transverse wheel force characteristics.

11. The method as recited in claim 1, further comprising:

determining a slip $\lambda_0$ corresponding to a zero longitudinal wheel force by extrapolating a linearly increasing range of a longitudinal wheel force characteristic; and correcting a determined value of the slip $\lambda_0$ using slip $\lambda_0$.

12. The method as recited in claim 1, further comprising:

determining an increase of a longitudinal wheel force characteristic from a wheel slip modulation divided by a longitudinal wheel force modulation.

13. A system for controlling a braking force in a vehicle, comprising:

an arrangement for determining actual values of controlled variables;

an arrangement for determining setpoint values of the controlled variables;

an arrangement for comparing the actual values with the setpoint values, thereby obtaining comparison results;

an arrangement for modulating torques at the wheels and being provided with a modulation frequency, thereby enabling a slip of the wheels and the wheel forces at the wheels to be modified; and an arrangement for influencing wheel forces on the basis of the comparison results, wherein:

the controlled variables include the wheel forces, the arrangement for determining the actual values of the wheel forces are implemented as a sensor system that measures the wheel forces, the arrangement for determining the setpoint values includes an arrangement for analyzing the slip of the wheels and the wheel forces of the wheels, and the arrangement for determining the setpoint values uses a result of the analysis of the slip of the wheels and the wheel forces of the wheels.

14. The system as recited in claim 13, wherein:
the sensor system determines longitudinal forces.

15. The system as recited in claim 13, wherein:
the sensor system determines transverse forces.

16. The system as recited in claim 13, wherein:
the arrangement for modulating the torques include a hydraulically arrangement.

17. The system as recited in claim 13, wherein:
the torques at the wheels are generated by an electric motor.

18. The system as recited in claim 13, wherein:
an amplitude of a modulation frequency is considerably less than the torques occurring in a normal driving operation.

19. The system as recited in claim 13, wherein:
the arrangement for analyzing the wheel forces and the slip of the wheels operates in specific frequency ranges of a known modulation frequency.

20. The system as recited in claim 18, wherein:
the modulation frequency is in the range from 50 Hz to 100 Hz.

21. The system as recited in claim 13, further comprising:
an arrangement for determining longitudinal wheel force characteristics of the wheels by analyzing the wheel forces and the slip of the wheels, wherein:
the wheel forces at a maximum of the longitudinal wheel force characteristics are used as wheel force setpoint values.

22. The system as recited in claim 13, further comprising:
an arrangement for determining transverse wheel force characteristics of the wheels by analyzing the wheel forces and the slip of the wheels; and an arrangement for determining a setpoint slip of particular ones of the wheels at which the setpoint values of transverse wheel forces occur from the transverse wheel force characteristics.

23. The system as recited in claim 13, further comprising:
an arrangement for determining a slip $\lambda_0$ corresponding to a zero longitudinal wheel force by extrapolating a linearly increasing range of a longitudinal wheel force characteristic; and an arrangement for correcting a determined value of the slip $\lambda_0$ using slip $\lambda_0$.

24. The system as recited in claim 13, further comprising:
an arrangement for determining an increase of a longitudinal wheel force characteristic from a wheel slip modulation divided by a longitudinal wheel force modulation.

* * * * *